(12) United States Patent
Blackburn et al.

(10) Patent No.: US 11,628,903 B2
(45) Date of Patent: Apr. 18, 2023

(54) ENHANCED DRIVING CONTROL SYSTEM FOR SNOWMOBILES

(71) Applicant: BRP Megatech Industries, Inc., Valcourt (CA)

(72) Inventors: Alexandre Blackburn, Notre-Dame-du-Mont-Carmel (CA); Luc St-Pierre, Shawinigan (CA); Alexandre Frigon, St-Boniface (CA); Alexandre Palardy, Shawinigan (CA); Francis Gagné, Saint-Roch-de-Mékinac (CA)

(73) Assignee: BRP Megatech Industries Inc., Valcourt (CA)

( * ) Notice: Subject to any disclaimer, the term of this patent is extended or adjusted under 35 U.S.C. 154(b) by 22 days.

(21) Appl. No.: 17/232,633

(22) Filed: Apr. 16, 2021

(65) Prior Publication Data
US 2021/0323629 A1 Oct. 21, 2021

Related U.S. Application Data

(60) Provisional application No. 63/012,440, filed on Apr. 20, 2020.

(51) Int. Cl.
*B62M 27/02* (2006.01)
*B62K 21/12* (2006.01)

(52) U.S. Cl.
CPC ............ *B62K 21/12* (2013.01); *B62M 27/02* (2013.01); *B62M 2027/026* (2013.01)

(58) Field of Classification Search
CPC ............ B62M 27/02; B62M 2027/021; B62M 2027/022; B62M 2027/023;
(Continued)

(56) References Cited

U.S. PATENT DOCUMENTS 4,826,184 A 5/1989 Kuehmchel et al.
6,131,693 A 10/2000 Mukai et al.
(Continued)

FOREIGN PATENT DOCUMENTS

CA 2639831 C 8/2011
CA 2476703 C 11/2011
(Continued)

OTHER PUBLICATIONS

Know Your Parts, "Steering Angle Sensor Basics", https://www.knowyourpartscom/technical-resources/electrical/steering..., 2020, 5 pages.
(Continued)

*Primary Examiner* — Anne Marie M Boehler
(74) *Attorney, Agent, or Firm* — BCF LLP

(57) ABSTRACT

A snowmobile having enhanced steering control has driving control system including an electrically actuated device coupled to a steering system having a user operated steering element with the device applying torque to the steering system, a throttle, a plurality of sensors including a torque sensor and at least one additional sensor to generate terrain condition data and operational data, and at least one controller coupled to the device and the sensors. The at least one controller selects a terrain condition mode using the generated terrain condition and generated operational data, determines the torque to apply responsive to the angle and speed of rotation of user operated steering element, and operates the electrically actuated device to apply the torque to the steering system, with the torque being applied only by the electrically actuated device.

24 Claims, 7 Drawing Sheets

(58) Field of Classification Search
CPC ...... B62M 2027/025; B62M 2027/026; B62M 2027/027; B62M 2027/028; B62D 5/0457; B62D 5/046; B62D 5/0463; B60W 10/20

See application file for complete search history.

(56) References Cited

U.S. PATENT DOCUMENTS

| | | | |
|---|---|---|---|
| 6,499,559 | B2 | 12/2002 | McCann et al. |
| 6,647,329 | B2 | 11/2003 | Kleinau et al. |
| 7,096,988 | B2 | 8/2006 | Moriyama |
| 7,413,046 | B2 | 8/2008 | Okada et al. |
| 7,970,511 | B2 | 6/2011 | Kohls |
| 8,235,164 | B2 | 8/2012 | Okada et al. |
| 8,256,323 | B2 | 9/2012 | Vellutini |
| 11,077,876 | B2 * | 8/2021 | Gagné .................. B60W 10/20 |
| 2006/0191739 | A1 * | 8/2006 | Koga .................... B62K 21/00 180/446 |
| 2015/0274205 | A1 * | 10/2015 | Murakami ............... B62D 5/04 280/89 |
| 2016/0096545 | A1 | 4/2016 | Nakakuki et al. |
| 2016/0121924 | A1 | 5/2016 | Norstad |
| 2019/0300052 | A1 * | 10/2019 | Allan ................... B62D 5/0457 |
| 2021/0362806 | A1 * | 11/2021 | Hedlund ............. B60G 17/015 |
| 2021/0387668 | A1 * | 12/2021 | Liu ..................... B62D 5/0463 |
| 2022/0063714 | A1 * | 3/2022 | Graus ................. B62D 5/0481 |

FOREIGN PATENT DOCUMENTS

| | | |
|---|---|---|
| CA | 2727128 C | 4/2013 |
| EP | 1302385 A2 | 4/2003 |
| EP | 1780096 A1 | 5/2007 |
| EP | 2079630 B1 | 3/2010 |
| JP | 2005193788 A | 7/2005 |
| KR | 20150018047 A | 2/2015 |
| WO | 2018185528 A1 | 10/2018 |

OTHER PUBLICATIONS

English language abstract for EP 2 079 630 B1 extracted from espacenet.com database on May 3, 2021, 1 page.
English language abstract for JP 2005-193788 A extracted from espacenet.com database on May 3, 2021, 1 page.
English language abstract for KR 2015-0018047 A extracted from espacenet.com database on May 3, 2021, 1 page.

* cited by examiner

ENHANCED DRIVING CONTROL SYSTEM FOR SNOWMOBILES

CROSS REFERENCE TO RELATED APPLICATIONS

The present disclosure claims priority from U.S. Provisional App. Ser. No. 63/012,440, filed Apr. 20, 2020 and entitled "Enhanced Steering Control System for Snowmobiles", the entirety of which is herein incorporated by reference.

TECHNICAL FIELD

Aspects of this disclosure generally relate to managing steering control of snowmobiles.

BACKGROUND

The steering system of a typical snowmobile provides little feedback to a user/operator when performing a turn. This lack of feedback may be interpreted by the user/operator as a lack of control, which can lead to dangerous conditions such as unintended sharp cornering, swerving, and collisions.

Power steering systems are known in the prior art and often used on snowmobiles and often use a detected speed of the snowmobile to determine a level of damping and apply the damping to the steering assembly of a snowmobile in order to provide stability to the steering assembly. Typically, a mechanical damper is assembled on the steering assembly to provide more stability of the steering assembly regardless of vehicle speed.

Other power steering systems used on snowmobiles may compute and apply to the steering assembly a level of damping using vehicle accelerations such as accelerations in any direction including the x-direction, the y-direction, and the z-direction. Again, a mechanical damper assembled on the steering assembly has a constant damping effect regardless of snowmobile acceleration.

The current power steering systems, however, may still experience instability if used in snowmobiles. Specifically, when a user/operator is operating the snowmobile over rough terrain the user/operator may rotate the handlebar or unexpectedly let go of the throttle on the handlebar. Similarly, the user/operator may forcefully engage the brake during operation over unexpectedly rough terrain. During these events, instability may occur to the handlebar or other steering elements which is felt by the user/operator. As such, there remains a need for a control method which provides stability to the handlebar or other steering elements of a snowmobile during abrupt or unexpected changing of acceleration.

SUMMARY

The present disclosure discloses a driving control system for a snowmobile. The snowmobile includes a vehicle body, an engine disposed in the vehicle body, a drive track device coupled to the engine with the drive track device including a track belt adapted to be positioned on the terrain, at least one ground engaging member disposed at a lower side of the vehicle body and adapted to be positioned on the terrain.

The driving control system includes a steering system having a user operated steering element, such as a handle, to adjust an angle of the at least one ground engaging member relative to a longitudinal axis of the snowmobile. The driving control system also includes a throttle mounted to the user operated steering element and coupled to the engine to adjust the operation of the engine to actuate the drive track device to rotate the track belt for propelling the snowmobile along the terrain. The driving control system also includes a plurality of sensors to generate terrain condition data of the terrain and to generate operational data of the snowmobile, wherein said plurality of sensors comprises a torque sensor to generate a portion of the operational data of the snowmobile and at least one additional sensor. The driving control system includes an electrically actuated device coupled to the steering system for applying a torque to the steering system.

The driving control system also includes at least one controller coupled to the electrically actuated device and to the sensors. The at least one controller selects a terrain condition mode using the generated terrain condition data and the generated operational data, wherein the terrain condition mode is selected from an ice on-trail mode, a snow on-trail mode, and a powder off-trail mode. The at least one controller also determines a torque to apply to the steering system responsive to an angle and speed of rotation of the user operated steering element by using the selected terrain condition mode and the generated operational data. The at least one controller also operates the electrically actuated device to apply the torque to the steering system for providing enhanced steering control of the snowmobile responsive to the angle and speed of rotation of the user operated steering element, with the torque being applied only by the electrically actuated device.

In certain embodiments, the at least one controller is also configured to modify the relative degree of the applied first torque based on a determined uphill or downhill condition of the snowmobile on the terrain during operation.

In certain embodiments, the at least one controller is also configured to provide a self-centering feature of the user operated control element during certain operating conditions such as pitch, acceleration, engine torque request, brake switch, unexpected throttle release and the like to provide damping or increased steering resistance in such cases, which can reduce rider fatigue, improve cornering and/or provide improved weight shift control for users, particular beginners.

The present disclosure also discloses a snowmobile having the enhanced driver control system as described above. Still further, the present disclosure also discloses an associated method for enhancing steering control of a snowmobile that includes the driving control system as described above.

The present disclosure provides enhanced steering control of snowmobiles that functions to accelerate the skill learning curve for beginners operating the snowmobile, particularly in harsh terrain conditions such as icy terrain conditions or powdery snow terrain conditions. The present disclosure also reduces physical efforts needed to perform various maneuvers on the snowmobile as a function of the terrain conditions and operational conditions, as the steering assist provided herein would encourage steering in the proper direction to reach and maintain a balance target. Still further, the present disclosure assists a user in addressing an imbalance during a turn maneuver by allowing the user to initiate a body transfer to initiate sled roll while better being able to hold onto the handlebars as compared with normally lighter steering. The present disclosure also provides damping or increases steering resistance when rider weight is transferred to the rear when driving in steep inclines or under harsh acceleration, which unloads the ground engaging members and makes the steering effort by a user lighter and the steering effect on the ground engaging members minimal. The present disclosure also provides steering assist or decreases steering resistance when rider weight is transferred to the front when driving in steep declines or under harsh braking, which loads the ground engaging members and makes the steering effort by a user harder and the steering effect to address plowing effect of the ground engaging members or the nose of the snowmobile in deep snow conditions which make the snowmobile harder to steer.

DETAILED DESCRIPTION

Figure 1:
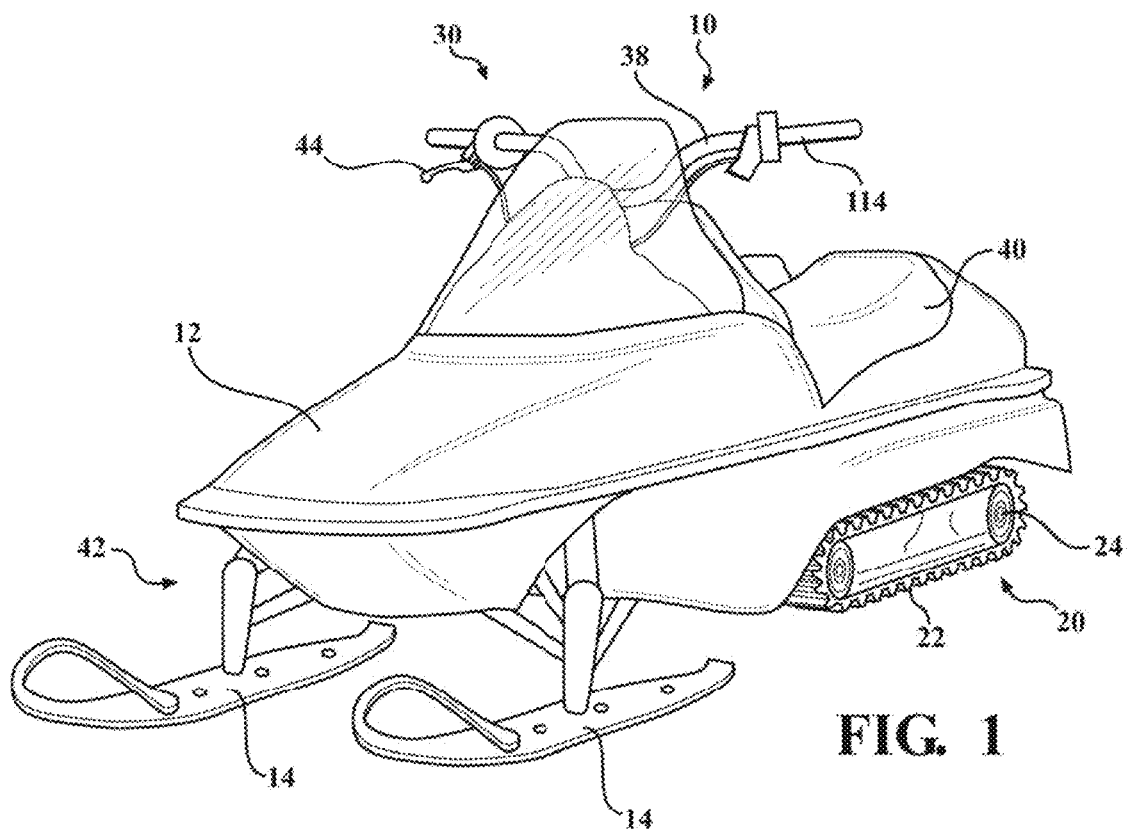
FIG. 1 is a perspective view of a snowmobile which may incorporate a driving control system of the present invention.
Figure 2:
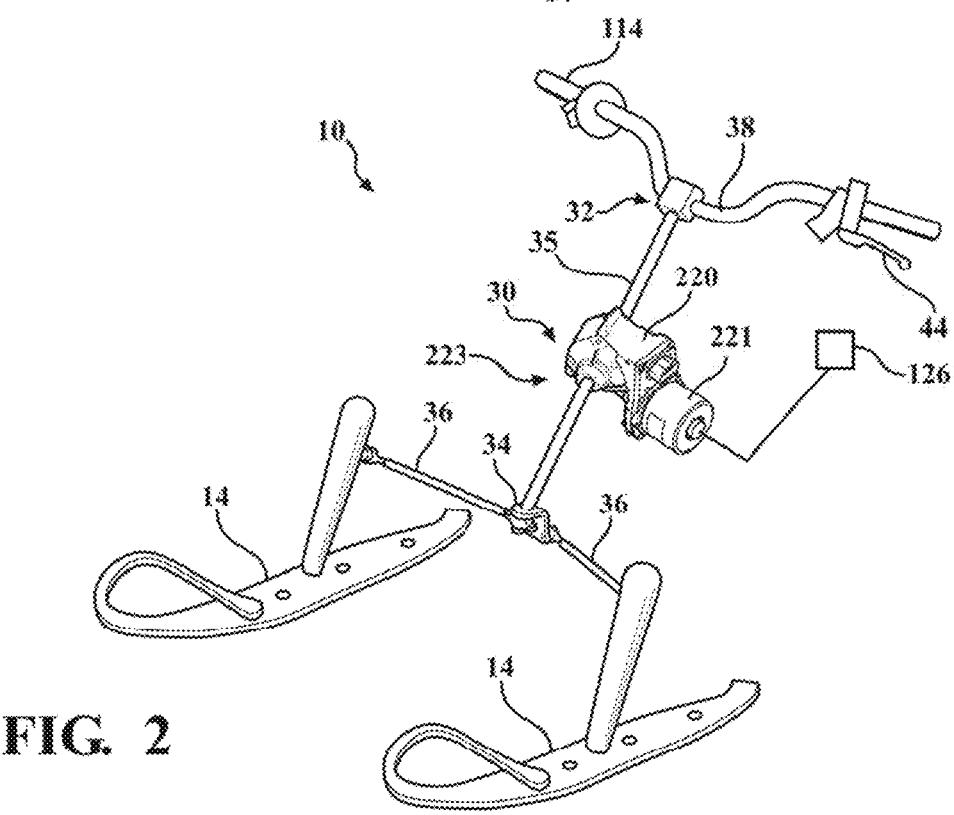
FIG. 2 is a perspective view of a steering assembly of the snowmobile which may incorporate the power steering system of the present invention.
Figure 3:
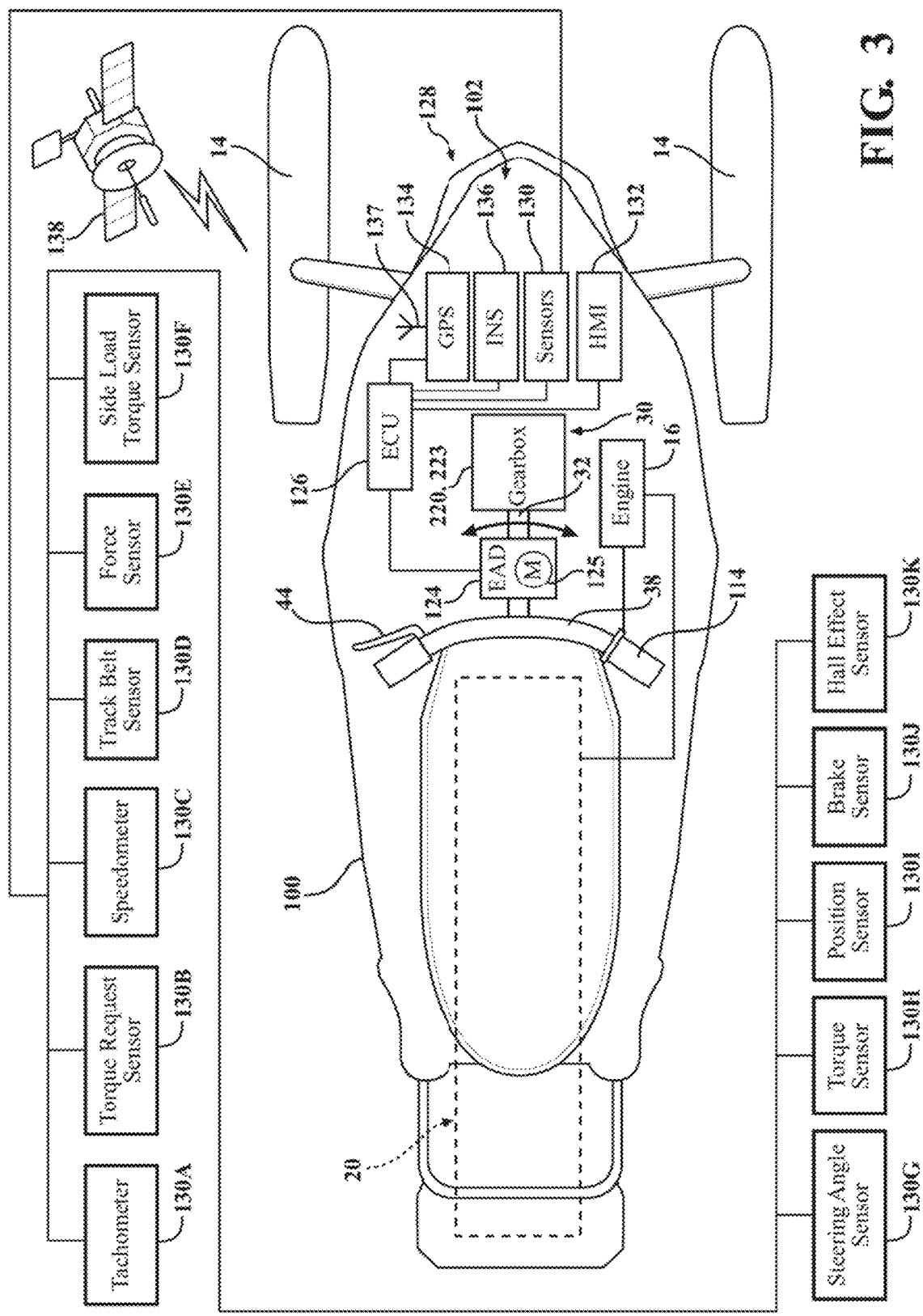
FIG. 3 is a schematic diagram illustrating the components of a snowmobile having enhanced steering control via the driving control system coupled to the steering system.

Referring now to FIGS. 1-3, a snowmobile 10 in accordance with an exemplary embodiment, generally includes a vehicle body 12, at least one ground engaging member 14 disposed at a lower side of the vehicle body 12 (i.e., at least one sled, shown as a left and right front sled 14 disposed at the lower front side of the vehicle body 12 in FIG. 1) adapted to be positioned on the terrain, an engine 16 disposed in an engine compartment 18 of the vehicle body 12, and a drive track device 20 to be driven by the engine 16 (see FIG. 2). The drive track device 20 has a track belt 22 also adapted to be positioned on the terrain. In certain embodiments, including the illustrated embodiments, the track belt 22 is wound around a plurality of wheels/sprockets 24.

The snowmobile 10 also includes a steering system 30. As best shown in FIG. 2, the steering system 30 includes a steering column 32 coupled to a steering rack 34 through a steering shaft 35 which is coupled to the one or more ground engaging members 14. It is also contemplated that the steering system 30 may comprise any mechanical link between the steering column 32 and the ground engaging members 14 as known by one of ordinary skill in the art including but not limited to linkages. Generally, the ground engaging members 14 are coupled to steering rods 36. The steering system 30 also has a user operated steering element 38, shown as a handle 38 (i.e., a handlebar) as illustrated in FIG. 2 or a steering wheel or joystick-type device or other user operated steering device (not shown). Movement of a user operated steering element 38, such as the handlebar 38 as illustrated in FIG. 2 or a steering wheel or joystick-type device or other user operated steering device (not shown), causes movement of the steering shaft 35 and steering rods 36 which turns the ground engaging members 14 to steer the snowmobile 10 in the desired direction. It is additionally contemplated that the steering system 30 may be a different user operated steering element which operates as known by one of ordinary skill in the art.

The snowmobile 10 also includes a seat 40 coupled to the vehicle body that is typically located rearward of the steering system 30 and generally above the drive track device 20 relative to the terrain. Still further, the snowmobile may have one or more shocks 42 coupled to the ground engaging members 14.

The steering system 30 also has a throttle 114 mounted to the handle 38 and coupled to the engine 16. A driver/user may interact with the throttle 114 to adjust the operation of the engine 16 to actuate the drive track device 20 to rotate the track belts 22 for propelling the snowmobile 10 along the terrain. The speed of the snowmobile 10 may correspond to the rotational speed of the track belt 22 for propelling the snowmobile 10 along the terrain. The greater the rotation of the throttle 114, the faster the track belts 22 rotates, and hence the faster the snowmobile 10 is propelled along the terrain. The steering system 30 also has a brake 44 mounted to the handle 38 for slowing down the snowmobile during operation.

In some conventional snowmobiles, the steering system 30 additionally includes a power steering system, and in particular an electronic power steering ("EPS") system, that is configured to help the user/operator of the snowmobile to steer or turn the ground engaging members of the snowmobile during use. However, this power steering system provides little or no steering feedback to a user/operator of the forces exchanged between the typical snowmobile and its environment, such as during a turn. Specifically, a user/operator of the snowmobile usually receives little or no resistive steering feedback from the load applied to the typical snowmobile by environmental conditions (e.g., snow, ice, inclines, declines, rough terrain, etc.), and receives little or no resistive steering feedback from the load the typical snowmobile applies to its surrounding environment. The steering feedback provided to a user/operator of a typical snowmobile does not significantly increase with speed.

An unexperienced user/operator, who may be used to the driving feel and steering dynamics of an automobile, may associate the lack of feedback and ease of steering with a lack of control. Feeling a lack of control can lead the user/operator to perform dangerous maneuvers, such as excessive steering operations at high speeds, which can potentially eject an unexpecting user/operator or passenger from the snowmobile. Moreover, the ease at which the typical snowmobile is turned may enable environmental elements, such as snow or uneven terrain, to cause the snowmobile to constantly veer off course. Unlike with an automobile, the loads between a typical snowmobile and its environment are often not sufficient to provide self-centering of the snowmobile. The user/operator of a typical snowmobile may thus need to perform several steering corrections while the snowmobile is operated to maintain a particular heading.

To overcome these and other issues, in one exemplary embodiment as shown schematically in FIG. 3, the snowmobile 10 may include a driving control system 102 coupled to the steering system 30 of the snowmobile 10 for providing enhanced steering control. The driving control system 102 may include an electrically actuated device (EAD) 124 and an electronic control unit (ECU) 126 coupled thereto. The EAD 124 may be configured to apply a torque to the steering system 30 of the snowmobile 10 based on electrical signals received from the ECU 126.

During operation of the snowmobile 10, the driving control system 102 may be configured to implement an active damper regulated based on various operational parameters monitored by the ECU 126. Specifically, the ECU 126 may be configured to operate the EAD 124 to apply additional or decreased resistance to the steering system 30 of the snowmobile 10 based on the monitored parameters. In this way, a user/operator may need to provide increased or decreased steering effort to turn the ground engaging members 14 of the snowmobile 10, which may better inform the user/operator of potential forces that can be generated by the snowmobile 10 responsive to a steering action. The driving feel of the snowmobile 10 will thus be closer to that of an automobile, which may be more intuitive and comfortable for the user/operator, and may correspondingly lead to greater confidence, better steering control, and avoidance of potentially dangerous maneuvers. Still further, this may also reduce user/operator fatigue associated with operating the vehicle under these operational parameters of the snowmobile 10.

As described above, the driving control system 102 may be coupled to the steering system 30, and more particularly to steering system 30 of the snowmobile 10 and may be configured to provide enhanced steering control of the snowmobile 10. The driving control system 102, as shown schematically in FIG. 3, may include the EAD 124, the ECU 126, a navigation system 128, a plurality of sensors 130, and a human machine interface (HMI) 132.

The EAD 124 may be coupled to the steering column 32 and may function as an electric power steering (EPS) system for the snowmobile 10 (and is shown as the EPS system in FIG. 3). To this end, the EAD 124 may include a motor 125, such as an electric motor, configured to apply torque to the steering column 32 in the clockwise and counter-clockwise directions, such as based on control signals received from the ECU 126. For example, the EAD 124 may include one or more arms coupled to the steering column 32 and rotatable by the motor 125 or may include a sleeve rotatable by the motor 125 through which the steering column 32 extends and is coupled to.

The ECU 126 (also referred to herein as a "controller") may be configured to communicate with other components of the snowmobile 10, or more particularly of the driving control system 102, directly and/or over one or more wired or wireless networks, such as a control area network (CAN). During operation of the snowmobile 10, the ECU 126 may be configured to control the EAD 124 based on terrain condition date and operational data received from the navigation system 128, the plurality of sensors 130, and/or the HMI 132.

The navigation system 128 may include a global positioning system (GPS) module 134 and/or an inertial navigation system (INS) module 136. The GPS module 134 and the INS module 136 may each be configured to determine and communicate to the ECU 126 data indicating the current position, heading, and velocity of the snowmobile 10.

The GPS module 134 may be configured to generate operational data in the form of geographic data indicating a current position of the snowmobile 10 by communicating with one or more orbiting satellites 138 via a GPS antenna 137 of the GPS module 134. Each position generated by the GPS module 134 may include the longitude and latitude coordinates of the snowmobile 10 at a given time. The GPS module 134 or ECU 126 may further be configured to generate operational data in the form of geographic data indicating a current heading of the snowmobile 10 by comparing two or more positions determined by the GPS module 134 over a set time period relative to direction of movement. The GPS module 134 or ECU 126 may also be configured to generate operational data indicating a current velocity (or current speed) of the snowmobile 10 by comparing two or more positions determined by the GPS module 134 over a set time period relative to time. Even still further, the GPS module 134 may be preloaded with data providing information regarding known snowmobile trails such that the ECU 126 can utilize geographical data obtained from the GPS module 134 and identify whether the snowmobile 10 is traveling on one of the plurality of known trails and utilize the obtained information as one of a plurality of weighted factors for selecting a terrain condition mode, as will be described in further detail below.

The INS module 136 may include an accelerometer, gyroscope, and/or magnetometer configured to calculate and generate operational data indicating the current position, orientation (e.g., heading) and velocity of the snowmobile 10. Specifically, based on a known geographic position of the snowmobile 10 at a given time, which may be determined using the GPS module 134 as described above, and on a known orientation and velocity of the snowmobile 10, which may be determined using the data generated by the GPS module 134 as described above and/or data generated by the INS module 136, the INS module 136 or the ECU 126 may be configured to determine an updated geographic position, heading, and velocity (speed) of the snowmobile 10 based on the data generated by the INS module 136 alone. In other words, the INS module 136 or ECU 126 may be configured to determine how the snowmobile 10 is moved relative to the previously known geographic position, heading, and/or velocity (speed) based on the data generated by the INS module 136 to determine an updated position, heading, and velocity (speed) of the snowmobile 10 at a given time.

The INS module 136 may enable the ECU 126 to determine the current geographic position, heading, and velocity (speed) of the snowmobile 10 when the GPS module 134 is unable to communicate with and receive data from the GPS satellite 138. Moreover, the ECU 126 may be configured to save power by primarily utilizing the INS module 136 as the primary source of geographic data, and utilizing data from the GPS module 134 to periodically calibrate the INS module 136 with the current geographic position, heading, and/or velocity (speed) of the snowmobile 10 as determined via data received from the GPS satellite 138. In other words, the ECU 126 may be configured to generate operational data indicating the current position, heading, and/or velocity (speed) of the snowmobile 10 by being configured to calibrate the INS module 136 using the GPS module 134, operate the INS module 136 to generate this data for a predefined time period, recalibrate the INS module 136 using the GPS module 134 responsive to expiration of the time period, and so on.

The plurality of sensors 130 may be configured to calculate and generate terrain condition data and operational data indicating the current operational state of the snowmobile 10. The ECU 126 may be configured to utilize the terrain condition data and operational data generated by the sensors 130 to control the EAD 124, as will be described further below.

For example, the plurality of sensors 130 may include a tachometer 130A configured to calculate and generate data indicating the rotational speed of the engine 16, a torque request sensor 130B configured to calculate and generate data indicating the amount of torque (i.e., a throttle rate) being requested by the user/operator from the engine 16 via the throttle 114 (e.g., the extent to which the user/operator is activating the throttle 114), and a speedometer (i.e., a speed sensor) 130C configured to calculate and generate data indicating the current speed (velocity) of the snowmobile 10. In addition, the plurality of sensors 130 may include a track belt sensor 130D or Hall Effect sensor 130K configured to calculate and generate data indicative of the rotational speed of the track belt 22 around the plurality of wheels 24 during operation of the snowmobile 10. Still further, the plurality of sensors 130 may include a force sensor 130E configured to calculate and generate data as to relative amount of force being applied on the seat 40 (such as when the user of the snowmobile 10 is sitting on the seat 40 or standing during operation). Still further, the plurality of sensors 130 may include a side load torque sensor 130F configured to calculate and generate data as to relative amount of steering side load corresponding to the weight transfer of the user/operator. Still further, the plurality of sensors 130 may include a brake sensor 130J generating brake lever data 324 indicating the application of the brake 44 by the user.

At least one of the plurality of sensors 130 may be positioned adjacent the steering system 30 to generate operational data indicative of a status of the steering system 30. For instance, the plurality of sensors 130 may include a steering angle sensor 130G configured to calculate and generate data indicating a current angle of the handle 38, such as relative to a center position of the handle 38, and a torque sensor 130H (see FIGS. 3 and 5) configured to calculate and generate data indicating the amount and direction of torque on the steering column 32. Still further, the plurality of sensors 130 may include a position sensor 130I configured to calculate and generate data indicating a shock load on the shocks 42 and that is designed to calculate and generate data indicating the relative disturbances along the terrain that are experienced by the user through the steering system 30 that may contribute to the status of the steering system 30.

Figure 5:
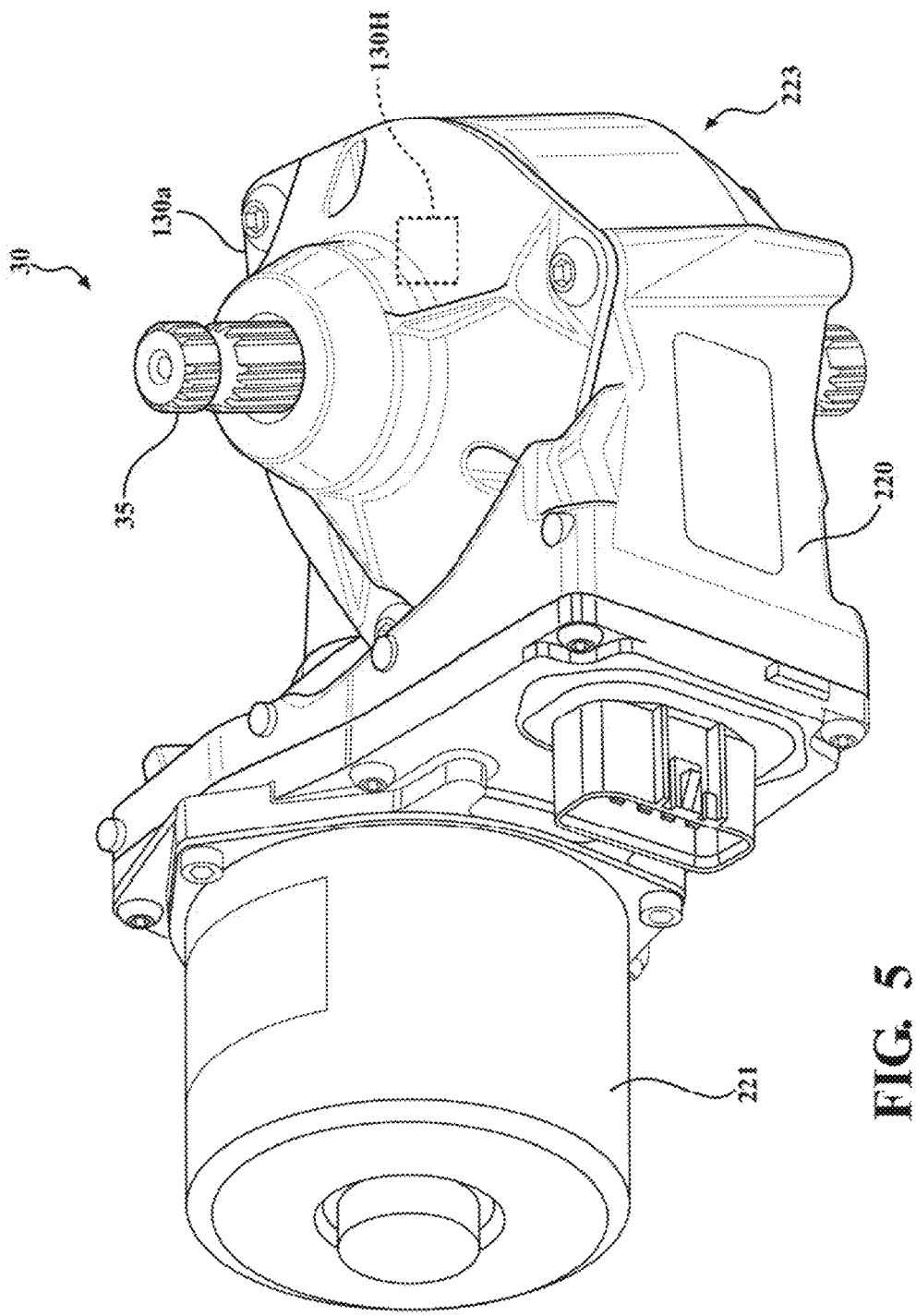
FIG. 5 is a perspective view of an exemplary driving control system that may be coupled to the steering system of a snowmobile to provide enhanced steering control for the snowmobile.

Preferably, the plurality of sensors 130 includes the torque sensor 130H positioned adjacent the steering system 30, and preferably adjacent to the steering shaft 35 (see FIG. 5). In further embodiments, the plurality of sensors 130 includes the steering angle sensor 130G and torque sensor 130H as described above.

In addition, the GPS module 134 and INS module 136 may also be considered as sensors 130 of the snowmobile 10 and can also be configured to utilize the accelerometer, gyroscope, and/or magnetometer to calculate and generate other operational data regarding additional performance features found on a snowmobile 10. For example, the INS module can be configured to utilize a gyroscope to calculate and generate additional operational data of the snowmobile 10 the relative amount of snowmobile 10 roll during a turn (sometimes referred to alternatively as vehicle roll) and/or to calculate and generate data regarding the average small positive X-angular position of the ground engaging members 14 during operation of the snowmobile (i.e. such as when the front skis 14 are higher than the track belt 22).

The HMI 132 may be positioned adjacent the handle 38 and may facilitate user interaction with the other components of the snowmobile 10, such as those of the driving control system 102. For example, the HMI 132 may enable user interaction with the ECU 126 and the navigation system 128 described above. The HMI 132 may include one or more video and alphanumeric displays, a speaker system, and any other suitable audio and visual indicators capable of providing data from the snowmobile 10 components to a user. The HMI 132 may also include a microphone, physical controls, and any other suitable devices capable of receiving input from a user to invoke functions of the snowmobile 10 components. The physical controls may include an alphanumeric keyboard, a pointing device (e.g., mouse), keypads, pushbuttons, and control knobs. A display of the HMI 132 may be an integrated touch screen display that includes a touch screen mechanism for receiving user input.

Figure 4:
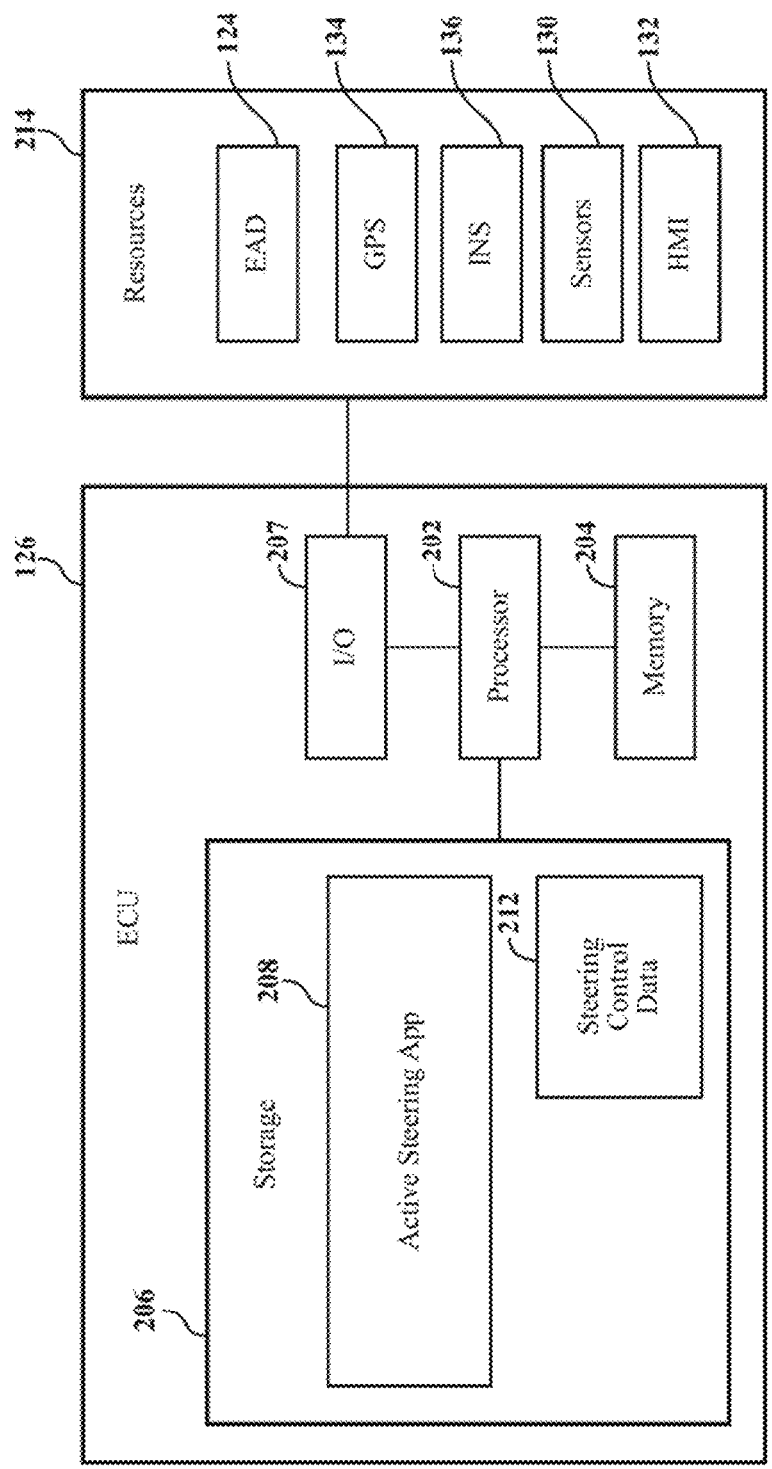
FIG. 4 is a schematic diagram illustrating a controller that may be included in the snowmobile of FIGS. 1-3.

Referring to FIG. 4, the ECU 126 may include a processor 202, memory 204, non-volatile storage 206, and an input/output (I/O) interface 207. The processor 202 may include one or more devices selected from microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on operational instructions read from the non-volatile storage 206 and stored in the memory 204. The memory 204 may include a single memory device or a plurality of memory devices including, but not limited, to read-only memory (ROM), random access memory (RAM), volatile memory, non-volatile memory, static random access memory (SRAM), dynamic random access memory (DRAM), flash memory, cache memory, or any other device capable of storing information. The non-volatile storage 206 may include one or more persistent data storage devices such as a hard drive, optical drive, tape drive, non-volatile solid-state device, or any other device capable of persistently storing information.

The processor 202 may be configured to read into memory 204 and execute computer-executable instructions residing in the non-volatile storage 206. The computer-executable instructions may embody software, such as an active steering application 208, and may be compiled or interpreted from a variety of programming languages and/or technologies, including, without limitation, and either alone or in combination, Java, C, C++, C #, Objective C, Fortran, Pascal, Java Script, Python, Perl, and PL/SQL.

The active steering application 208 may be configured to implement the functions, features, modules, processes, and methods of the ECU 126 described herein. In particular, the computer-executable instructions embodying the active steering application 208 may be configured, upon execution by the processor 202, to cause the processor 202 to implement the functions, features, modules, processes, and methods of the ECU 126 described herein. For instance, the active steering application 208 of the ECU 126 may be configured to monitor the operating condition of the snowmobile 10, such as based on terrain condition data and operational data received from the navigation system 128 and/or the plurality of sensors 130. Responsive to the terrain condition data and operational data indicating a user torque applied to the steering system 30, such as via the handle 38, the active steering application 208 may be configured to determine an additional torque to apply to the steering system 30 based on the operational data and based on a selected terrain condition mode determined from the terrain condition data (as will be described below), and to operate the EAD 124 to apply the torque to the steering system 30. As described in more detail below, application of the additional torque to the steering system 30 may function to provide an active damper, self-centering feature, and other enhanced steering functions to the user/operator.

The non-volatile storage 206 may also include data supporting the functions, features, modules, processes, and methods of the ECU 126 described herein. The software of the ECU 126, such as the active steering application 208, may be configured to access this data during execution to determine how to provide various forms of enhanced steering control. For instance, the non-volatile storage 206 of the ECU 126 may include steering control data 212. As described in more detail below, the steering control data 212 may define one or more lookup tables that associate snowmobile 10 operational conditions and associate snowmobile terrain conditions, such as indicated by the data generated by the navigation system 128 and/or plurality of sensors 130, with a torque to apply to the steering system 30. One exemplary lookup table may include a plurality of preloaded terrain conditions modes 302 and include an algorithm designed to selected one of the plurality of terrain condition modes based upon terrain condition data generated by the plurality of sensors 130, as described further below.

The ECU 126 may be operatively coupled to one or more external resources 214 via the I/O interface 207. The I/O interface 207 may include one or more wireless interfaces such as Wi-Fi and Bluetooth, and may include one or more wired interfaces such as Ethernet and CAN. The external resources 214 may include one or more other components of the snowmobile 10. For example, the external resources 214 may include the EAD 124, the GPS module 134, the INS module 136, the sensors 130, and the HMI 132.

While an exemplary snowmobile 10 is illustrated in FIGS. 1-3, the example is not intended to be limiting. Indeed, the snowmobile 10 may have more or fewer components, and alternative components and/or implementations may be used. For instance, two or more of the above-described components of the driving control system 102, such as two or more of the EAD 124, ECU 126, plurality of sensors 130, or navigation system 128, may be combined into a signal unit or device adapted to be secured to the steering column 118 of the steering system 30. As an example, FIGS. 2 and 5 illustrates a driving control device 220 adapted to be secured to the steering column 32 of the steering system 30. The driving control device 220 may include the components of the driving control system 102, such as the EAD 124, the ECU 126, and the one more of the sensors 130 (including for example a torque sensor and steering angle sensor, shown as 130a in FIG. 5). In addition, the driving control device 220 also includes a motor 221 and a gearbox 223. The gearbox 223 is coupled to the motor 221 and to the steering shaft 35. The torque sensor and steering angle sensor 130a may be coupled to the steering shaft 35, may be in communication with the ECU 126, and may be configured to sense deformation of the steering shaft 35.

Figure 6:
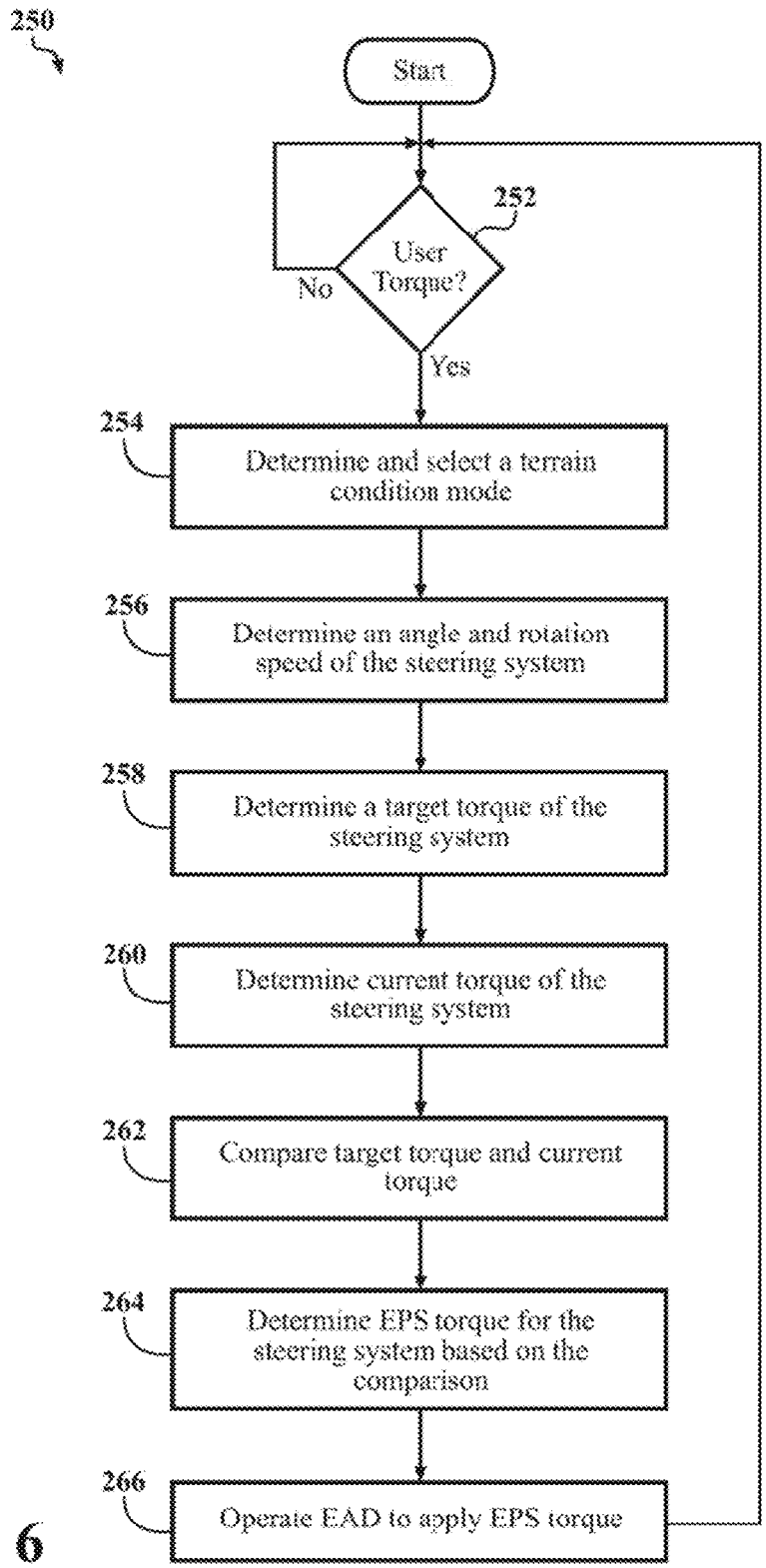
FIG. 6 is a flowchart of a method for implementing an active damper in the snowmobile of FIGS. 1-3.
Figure 7:
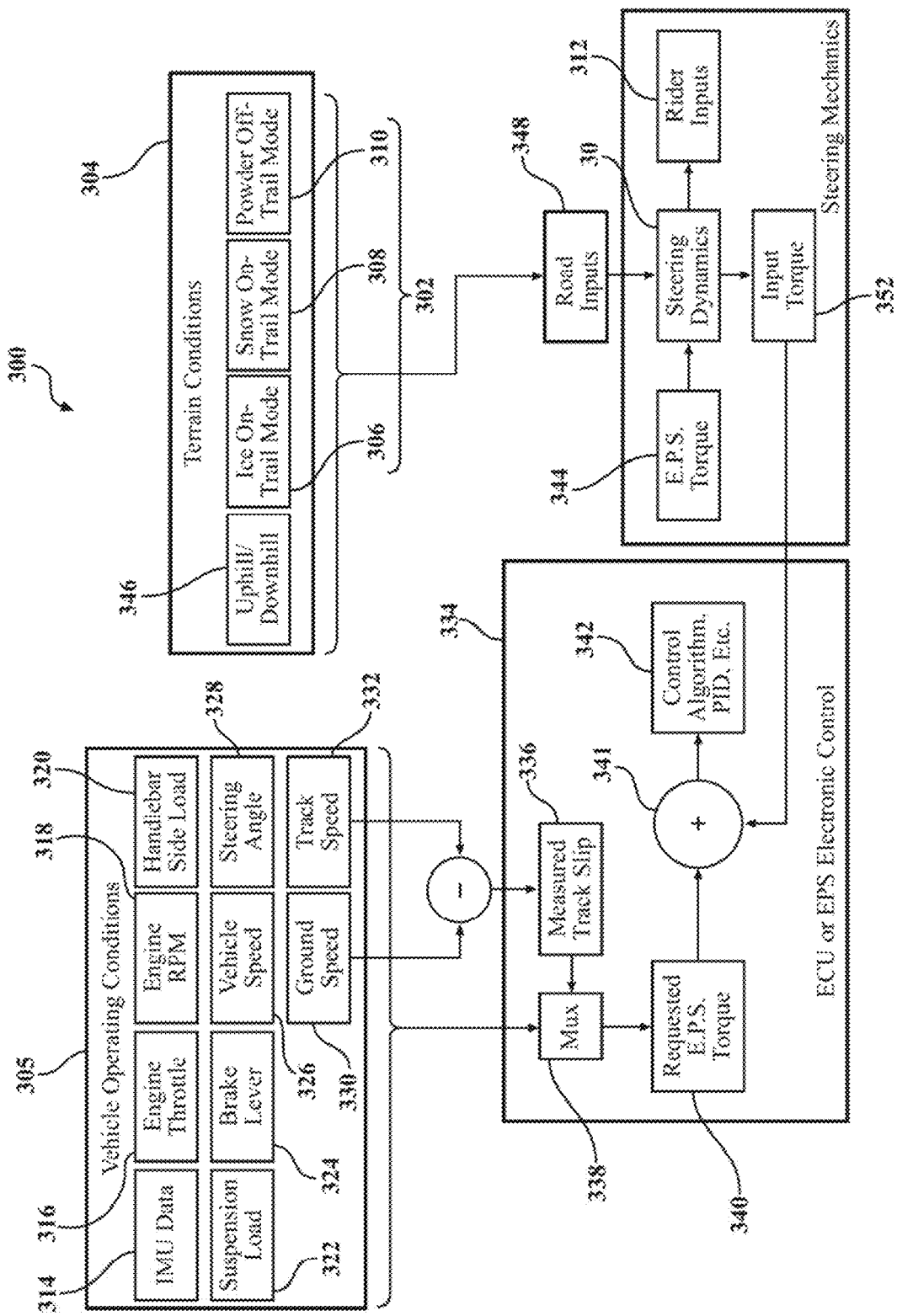
FIG. 7 is a diagram of a processing architecture for implementing an active damper in the snowmobile of FIGS. 1-3.
Figure 8:
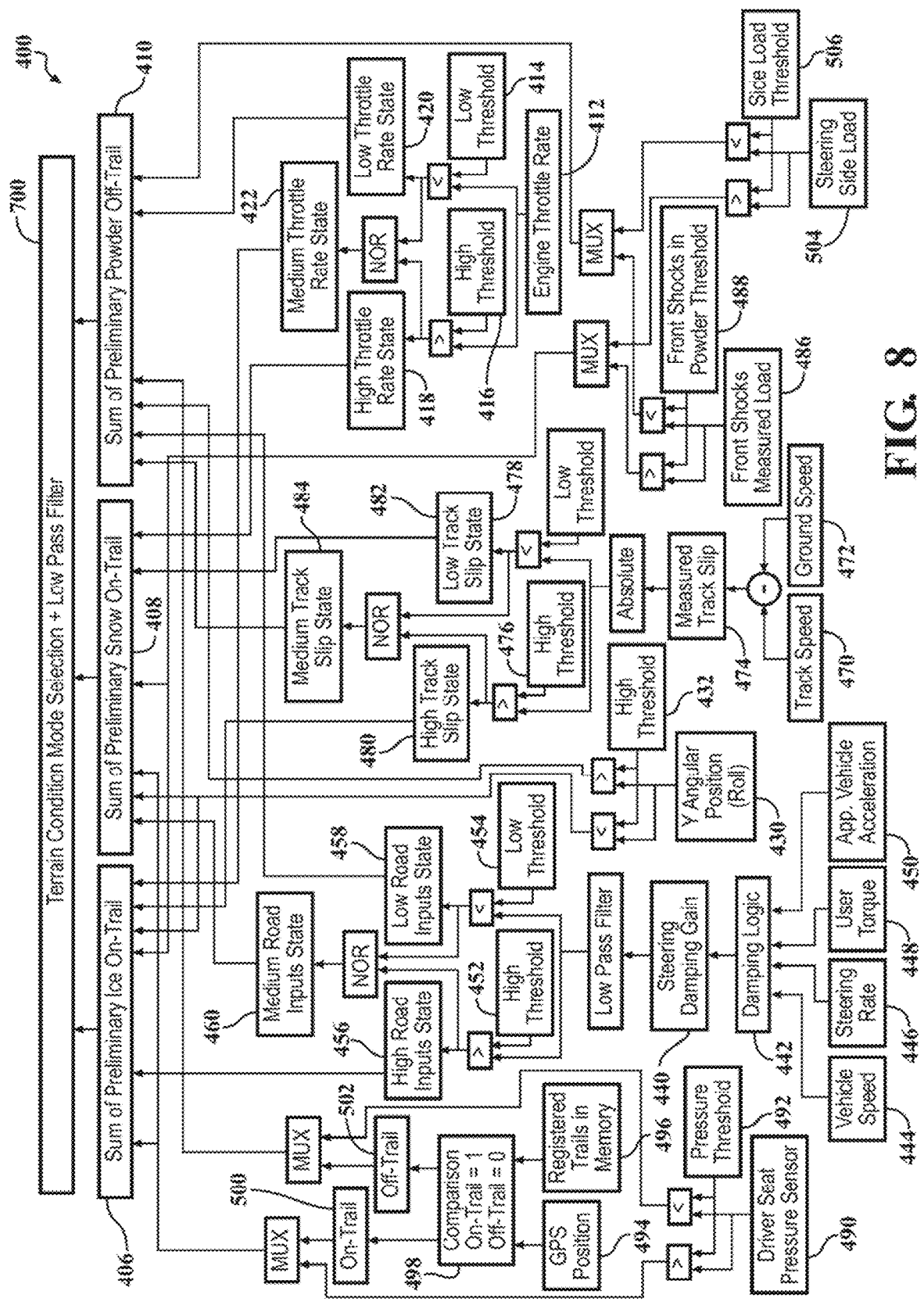
FIG. 8 is a flow chart of a mode selection algorithm for determining a preliminary terrain condition mode for a plurality of criteria for use in determining the terrain condition mode of Step 254 of FIG. 6.

FIG. 6 illustrates a method 250, in the form of a logic flow diagram, for providing enhanced steering control for the snowmobile 10 in the form of an active damper, and FIG. 7 illustrate a processing architecture 300 for implementing the active damper. FIG. 8 also provides a logic flow diagram of a mode selection algorithm for selecting a preliminary terrain condition mode based upon based on generated terrain and operational condition data for aiding the processing architecture 300 for selecting the terrain condition mode in block 254 of FIG. 6, as will be described further below. The active damper may function to increase feedback felt by a user/operator when turning the snowmobile 10 via the handle 38. Such feedback may inspire the user/operator of the snowmobile 10 with greater confidence and steering control, leading to avoidance of potentially dangerous maneuvers, such as sharp and excessive steering operations as described above. The ECU 126 may be configured to implement the method 250 and processing architecture 300, such as upon execution of the active steering application 208. For instance, the processing architecture 300 may include an active damper control module 334, which may be implemented by the ECU 126 upon execution of the computer-executable instructions embodying the active steering application 208. The active damper control module 334 may then be configured to perform the method 250. The following description of implementation of the active damper thus includes reference to FIGS. 6-8.

In block 252, a determination may be made of whether user torque 312 (i.e., rider inputs 312) is being applied to the steering system 30, such as via rotation of the handle 38. As described above, the plurality of sensors 130 may include the steering angle sensor 130G and the steering torque sensor 130H (see FIG. 5) that measures these rider inputs 312. These sensors 130, 130H, 130G may be integrated with EAD 124 or may be external of the EAD 124 and otherwise mounted to the steering system 30 of the snowmobile 10 (e.g., mounted to the handle 38 or steering column 32). Responsive to an input of user torque 312 to the handle 38 to perform a turn, the steering angle sensor 130G may generate operational data indicating the changing angle of the steering system 30, or more particularly of the handle 38, and the steering torque sensor 130H may generate operational data indicating the torque on the steering system 30. Responsive to the steering angle sensor 130G generating operational data indicating that the handle 38 is being rotated, such as to a degree greater than a predefined threshold and/or at a speed greater than a predefined threshold, and/or to the steering torque sensor 130H generating operational data indicating that the steering system 30 has a torque greater than a predefined threshold, the ECU 126 may be configured to determine that user torque 312 is being applied to the steering system 30.

In block 254 of FIG. 6, and as also shown in FIG. 7, responsive to application of user torque 312, a terrain condition mode 306, 308 or 310 may be determined and selected by the ECU 126 for the snowmobile 10 from a plurality of predetermined terrain conditions modes 302 stored on the ECU 126 based upon the current terrain conditions 304 (i.e., terrain condition data 304) on which the snowmobile 10 is operating.

As snowmobiles 10 typically operate on snow or ice-covered terrain conditions, some of the plurality of predetermined terrain condition modes 302 are designed to closely correspond to the conditions most typically found on snowmobile trails, including icy conditions (i.e., an ice on-trail mode 306) and packed snow conditions (i.e., a snow on-trail mode 308) that are typically found on known trails such as park trails or government trails. In addition, at least one predetermined terrain condition mode is designed to correspond to powdery snow conditions that are typically found off known snowmobile trails (i.e., a powder off-trail mode 310).

In particular, the ECU 126 determines which of the plurality of predetermined terrain conditions modes 302 should be selected (selected terrain condition mode is shown as 700 in FIG. 8) based upon terrain condition data 304 and vehicle condition data 305 generated by the plurality of sensors 130.

Even more particularly, in certain embodiments (referred to herein as a first exemplary embodiment), the ECU 126 is configured to select the terrain condition mode 306, 308, or 310 by being configured to:
  (a) determine a relative throttle rate of the throttle 114;
  (b) determine a relative degree of vehicle roll of the snowmobile 10;
  (c) determine a relative degree of steering damping gain for the snowmobile 10;
  (d) select a preliminary terrain condition mode for each of steps (a)-(c);
  (e) select the terrain condition mode based a comparison of the selected preliminary terrain condition modes of step (d).

Alternatively, in certain other embodiments (referred to herein as a second exemplary embodiment), the ECU 126 is configured to select the terrain condition mode 306, 308, or 310 by further being configured to:
  (a) determine a relative throttle rate of the throttle 114;
  (b) determine a relative degree of vehicle roll of the snowmobile 10;
  (c) determine a relative degree of steering damping gain for the snowmobile;
  (d) determine a relative degree of track slip between the track belt 22 and the terrain;
  (e) determine a relative degree of load applied to a shock 42 coupled to the at least one ground engaging member 14;
  (f) determine a force applied to a seat 40 coupled to the vehicle body 12 from a user;
  (g) determine a relative positioning of the snowmobile 10 on the terrain;
  (h) determine a relative degree of steering side load;
  (i) select a preliminary terrain condition mode for each of steps (a)-(h); and
  (j) select the terrain condition mode based on a comparison of the selected preliminary terrain condition modes of step (i).

The methodology for determining the criteria of steps (a)-(c) (i.e., the particular present operational or terrain condition data 304, 305 of each individual step (a)-(c)) in the first exemplary embodiment or for determining the criteria of steps (a)-(h) in the second exemplary embodiment), utilizes terrain condition data 304 and/or vehicle condition data 305 (see FIG. 7) which is received from the INS 136, the plurality of sensors 130 and/or the navigation system 128.

Such terrain condition data 304 and/or vehicle condition data 305 that may be utilized to select a preliminary terrain condition mode 406, 408, 410 (see FIG. 8) in any one of the criteria of steps (a)-(c) in the first exemplary embodiment or steps (a)-(h) in the second exemplary embodiment include inertial measurement unit (IMU) data 314 generated from the gyroscopes or accelerometers, engine torque request data 316 indicating an engine torque request value corresponding to the extent of user activation of the throttle 114 sensed by the torque request sensor 130B, engine RPM data 318 indicating an RPM value of the engine 16 as sensed by the tachometer 130A, handlebar side load data 320 indicating a relative degree of side load on the handlebar 38 during operation of the snowmobile generated from the side load torque sensor 130F and/or from the torque sensor 130H, suspension load data 322 such as the relative degree of load applied to the shock 42 generated from a position sensor 130I and/or to the relative degree of load applied to the seat 40 by a user generated from a driver seat force sensor 130E, brake lever data 324 indicating the application of the brake 44 by the user generated from a brake sensor 130J, vehicle speed data 326 indicating the speed of the snowmobile 10 generated from a speedometer 130C and/or from the GPS module 134 or another speed sensor 130, steering angle data 328 indicating the relative degree of angle of rotation of the handlebar 38 in a first or second direction relative to a neutral position generated from a steering angle sensor 130G and/or from the steering torque sensor 130H, ground speed data 330 indicating a speed at which the snowmobile is being propelled along the terrain generated by the GPS module 134 or the speedometer 130C, and track belt speed data 332 indicating the relative speed of rotation of the track belt 22 around the plurality of wheels 24 generated by a Hall Effect sensor 130K and/or the speedometer 130C and/or the track belt sensor 130D. The vehicle condition data 305 is received into a multiplexer (MUX) 338 of an active damper control module 334. The ground speed data 330 and track speed data 332 generated by the GPS module 134 or a speed sensor 130C can also be received by the active control damper module and compared to one another by the ECU 126 to determine a measured track slip 336 amount, which is also inputted into the multiplexer 338.

As noted above, as part of the methodology of either the first or second exemplary embodiment in block 254 for determining the selection of the terrain condition mode 302, a preliminary terrain condition modes 406, 408, 410 are individually selected for each of the criteria for steps (a)-(c) in the first exemplary embodiment or each of the criteria for steps (a)-(h) in the second exemplary embodiment. The weight of each preliminary terrain condition mode of each individual steps (a)-(c) in the first exemplary embodiment or for each individual steps (a)-(h) of the second exemplary embodiment for determining the selection of the terrain condition mode for subsequently determining the amount of first torque to apply to the steering system to provide enhanced steering control may vary in relative proportion from a very large amount to a very small amount depending upon the unique set data determined and is provided by an algorithm included on the preloaded software or lookup tables contained in the memory 204 of the ECU 126.

To determine the preliminary terrain condition mode 406. 408, 410 to select for each of the individual steps (a)-(c) or (a)-(h) and to subsequently determine the methodology for selecting a terrain condition mode 700 (corresponding to a selected one of the terrain condition modes 302 chosen from 306, 308, 310), a logic flow diagram of a mode selection algorithm 400 such as illustrated in FIG. 8 can be used so as to determine which preliminary terrain condition mode 406, 408, 410 to select on the basis of the determined terrain or operation data from individual steps (a)-(c) or (a)-(h).

Referring now to FIG. 8, the mode selection algorithm 400 includes a flow chart for determining which one of three separate mode selection to preliminarily select for at least some of the criteria of steps (a)-(h) provided in the second exemplary embodiment. In particular the mode selection algorithm 400 includes an ice on-trail preliminary terrain condition mode 406, a snow on-trail preliminary terrain condition mode 408, and a powder off-trail preliminary terrain condition mode 410. The preliminary terrain condition modes 406, 408, 410 are closely associated with the corresponding ice on-trail mode 306, a snow on-trail mode 308, and a powder off-trail mode 310 and are utilized by the ECU 126 in determining which terrain condition mode 306, 308, 310 from the plurality of terrain condition modes 302 is selected (i.e., the selected terrain condition mode 700 as shown in FIG. 8) based upon the combination of the selected preliminary terrain condition modes 406, 408, 410.

Regarding step (a), the mode selection algorithm 400 begins in block 412 wherein the engine torque request data 316 provides the current determined relative throttle rate and compares the determined relative throttle rate to a predetermined respective low and high threshold throttle rate (blocks 414 and 416) that are stored in a lookup table on the ECU 126. If the ECU 126 determines that the determined relative throttle rate exceeds the predetermined high threshold throttle rate, a high threshold rate state is determined (block 418) and a snow on-trail preliminary terrain condition mode 408 is selected. If the ECU 126 determines that the determined relative throttle rate is below the predetermined low threshold throttle rate, a low threshold rate state is determined (block 420) and a powder off-trail preliminary terrain condition mode 410 is selected. If the ECU 126 determines that the determined relative throttle rate is at or below the predetermined high threshold throttle rate and at or above the predetermined low threshold throttle rate, a medium threshold rate state is determined (block 422) and an ice on-trail preliminary terrain condition mode 406 is selected.

Regarding step (b), the mode selection algorithm 400 begins in block 430, wherein the Y-angular position of the snowmobile 10 is determined, sometimes referred to as an angular degree of vehicle roll of the snowmobile relative to the Y-axis, which corresponds to the inertial measurement data 314 generated from the gyroscopes or accelerometers. If the ECU 126 determines that the determined degree of vehicle roll exceeds the predetermined y-angular position vehicle roll rate (block 432), a powder off-trail preliminary terrain condition mode 410 is selected. If the ECU 126 determines that the determined degree of vehicle roll is at or below the predetermined y-angular position vehicle roll rate, a snow on-trail preliminary terrain condition mode 408 is selected.

Regarding step (c), the mode selection algorithm 400 begins in block 440, wherein a steering damping gain for the snowmobile is determined using at least the torque sensor 130 and compares the determined steering damping gain to a predetermined low and high threshold steering damping gain (block 452 and 454) that are stored in a lookup table on the ECU 126. The steering damping gain can be determined from a damping logic calculation (block 442), which factors in the determined vehicle speed 442 (calculated by the ECU 126 from the vehicle speed data 326), steering rate 444 (calculated by the ECU 126 from the steering angle data 328 and the user torque 312), user torque 448 (i.e., the user torque 312), and apparent vehicle acceleration 444 (calculated by the ECU from the engine throttle data 316, ground speed data 336, and the track speed data 332).

If the ECU 126 determines that the determined steering damping gain exceeds the predetermined high steering damping gain, a high road inputs state is determined (block 456) and an ice on-trail preliminary terrain condition mode 406 is selected. If the ECU 126 determines that the determined steering damping gain is below the predetermined low steering damping gain, a low road inputs state is determined (block 458) and a powder off-trail preliminary terrain condition mode 410 is selected. If the ECU 126 determines that the determined steering damping gain is at or below the predetermined high steering damping gain and at or above the predetermined steering damping gain, a medium road inputs state is determined (block 460) and a snow on-trail preliminary terrain condition mode 408 is selected.

Regarding step (d), the mode selection algorithm 400 begins block 474, wherein a measured track slip rate is determined by comparing the current track belt speed (block 470) (calculated by the ECU 126 from the track belt speed data 332), with the current snowmobile ground speed (block 472) (calculated by the ECU 126 from the ground speed data 330).

If the ECU 126 determines that the determined measured track slip rate exceeds the predetermined high threshold track slip rate, a high track slip state is determined (block 480) and an ice on-trail preliminary terrain condition mode 406 is selected. If the ECU 126 determines that the determined measured track slip rate is below the predetermined low threshold track slip rate, a low track slip state is determined (block 482) and a snow on-trail preliminary terrain condition mode 408 or an ice on-trail preliminary terrain condition mode 410 is selected. If the ECU 126 determines that the determined measured track slip rate is at or below the predetermined high threshold track slip rate and at or above the predetermined low track slip rate, a medium track slip state is determined (block 484) and a powder off-trail preliminary terrain condition mode 410 is selected.

Regarding step (e), the mode selection algorithm 400 begins in block 486, wherein the front shock load of the shock 42 of the snowmobile 10 is measured, which corresponds to the suspension load data 322 such as the relative degree of load applied to the shock 42 generated from a position sensor 130 as noted above. If the ECU 126 determines that the front shock measured load exceeds the predetermined front shock in powder threshold (block 488), an ice on-trail preliminary terrain condition mode 406 and snow on-trail terrain condition are equally selected. If the ECU 126 determines that the front shock measured load is at or below the predetermined front shock in powder threshold, a powder off-trail preliminary terrain condition mode 410 is selected.

Regarding step (f), the mode selection algorithm 400 begins in block 490, wherein the force load applied on the driver seat of the snowmobile 10 is measured by a driver seat pressure sensor, which corresponds to the suspension load data 322 such as the relative degree of load applied to the seat 40 generated from a driver seat pressure sensor 130 as noted above. If the ECU 126 determines that the driver seat pressure load exceeds the predetermined pressure threshold (block 492), an ice on-trail preliminary terrain condition mode 406 and a snow on-trail preliminary terrain condition mode 408 are equally selected. If the ECU 126 determines that the driver seat pressure load is at or below the predetermined pressure threshold, a powder off-trail preliminary terrain condition mode 410 is selected.

Regarding step (g), the mode selection algorithm 400 begins in block 498, wherein the ECU 126 makes a determination as to whether the snowmobile 10 is on or off a registered or otherwise known trail by determining the relative position of the snowmobile on the terrain using the GPS module 134 (block 494) and by accessing a plurality of known or otherwise registered trails stored into the memory 204 of the ECU 126 or otherwise stored on the GPS module 134 (block 496). If the ECU 126 determines that the relative position of the snowmobile 10 is on a known or registered trail, an ice on-trail preliminary terrain condition mode 406 and a snow on-trail preliminary terrain condition mode 408 are equally selected. If the ECU 126 determines that the relative position of the snowmobile 10 is not on a known or registered trail, a powder off-trail preliminary terrain condition mode 410 is selected.

Regarding step (h), the mode selection algorithm 400 begins in block 504, wherein the side steering load is determined, which corresponds to handlebar side load data 320 indicating a relative degree of side load on the handlebar 38 during operation of the snowmobile 10 generated from a torque sensor as noted above. If the ECU 126 determines that the measured side steering load exceeds the predetermined side load threshold (block 506), an ice on-trail preliminary terrain condition mode 406 and a snow on-trail preliminary terrain condition mode 408 are equally selected. If the ECU 126 determines that the measured side steering load is at or below the predetermined side load threshold, a powder off-trail preliminary terrain condition mode 410 is selected.

In certain exemplary embodiments, in addition to the selection of the preliminary terrain condition modes 406, 408, 410 as in steps (a)-(c) of the first exemplary embodiment or steps (a)-(h) in the second exemplary embodiment, one or more additional operating parameters of the snowmobile 10 can also be included with a corresponding individual or collective preliminary terrain condition mode 406, 408, or 410 selected. In particular, in one exemplary embodiment, the terrain condition data 304 can also be utilized to determine a lateral displacement of the snowmobile 10 in the Z-direction relative to the terrain (step (k)) and/or to determine a positive X-angular displacement of the at least one ground engaging member 14 (step (1)). An additional preliminary terrain condition mode 406, 408, or 410 based on the determined lateral displacement of the snowmobile in the Z-direction relative to the terrain, the determined positive X-angular displacement of the at least one ground engaging member, or a combination thereof can then be determined in a step (j).

Finally, the selection of the terrain condition mode 700 from the plurality of terrain condition modes 302 (or 306, 308, 310) is made by the ECU 126 based on a comparison of the selected preliminary terrain condition modes 406, 408, 410 from step (d) of the determined criteria of steps (a)-(c) from the first exemplary embodiment, or based on a comparison of the selected preliminary terrain condition modes 406, 408, 410 from step (i) in the second exemplary embodiment, which corresponds to the generated terrain condition data 304 and/or the generated terrain condition data 305 generated by the sensors 130, and optionally also based on a comparison of the additional selected terrain condition mode from step (j) above. In particular, the particular combination of preliminary terrain selection modes (such as the sum of the respective selected preliminary terrain condition modes 406, 408, 410 according to the flow chart in FIG. 8) is compared by the algorithm on the preloaded software or lookup tables contained in the memory 204 of the ECU 126 to determine which terrain condition mode (i.e., which mode 302 of the ice on-trail mode 306, the snow on-trail mode 308 or the powder off-trail mode 310 should be the selected mode 700) most closely corresponds to the terrain conditions upon which the snowmobile is operating. On the basis of this determination, the ECU 126 selects the most appropriate one of the terrain condition modes 306, 308, 310 as the selected mode 700, which is utilized in further steps of the method below.

In block 256, responsive to application of user torque 312 to the steering system 30, an angle and speed of the steering system 30, such as an angle and speed of rotation of the handle 38 may be determined. In particular, the ECU 126 may be configured, such as via implementation of the active damper control module 334, to determine steering angle/speed data 328 indicating the angle and speed of the steering system 30 based on the operational data generated by the steering angle sensor. The operational data generated by the steering angle sensor 130 may indicate an angle of the steering system 30, or more particularly the handle 38. The operational data generated by the steering angle sensor may also indicate a speed of rotation of the handle 38 by indicating the changing angle of the handle 38 over time.

In block 258, a target torque for the steering system 30 may be determined, such as based on the operational data generated by the plurality of sensors 130 and/or navigation system 128 of the snowmobile 10 and based on the selected terrain condition mode 700 of the plurality of terrain condition modes 302 (306, 308, 310) as determined in block 254. In certain embodiments, the target torque is a centering torque that when subsequently applied to the steering system 30 returns the steering system 30 to a center position (i.e., a position wherein the user operated steering element 38 such as the handle 38 is centered such that the snowmobile 10 is propelled straight corresponding to an axis defined along the length of the snowmobile 10).

In particular, the active damper control module 334 may receive the steering angle/speed data 328 determined based on the operational data generated from the steering angle sensor. The active damper control module 334 may also receive additional operational data, namely certain of the vehicle condition data 305 from the plurality of sensors 130 and/or navigation system 128 as described above. Still further, the active damper control module 334 may receive the selected terrain condition mode 700 from the ECU 126 determined in step 254.

The active damper control module 334 may be configured to determine target torque data 340 (i.e., requested EPS torque 340 in FIG. 7) based on the angle and speed of the steering system 30 indicated in the steering angle/speed data 328, and/or based on one or more of the values determined from the additional data, in conjunction with the selected terrain condition mode 700 as described above. The target torque data 340 may indicate an amount of torque desired to be present on the steering system 30 during a turn to simulate a steering feedback-based driving feel to the user that is also based on the current terrain conditions. In other words, the target torque data 340 may indicate an amount of torque that should exist on the steering system 30 so that the user/operator feels a resistive force when making a turn suitable for the current terrain conditions.

The active damper control module 334 may be configured to determine the target torque data 340 based on the steering control data. The steering control data of the ECU 126 may include a lookup table that associates one or more operational parameters (e.g., engine RPM value, engine torque request value, vehicle speed value, steering angle, and/or steering speed) from the vehicle condition data and selected terrain condition mode 700 with a target torque for the steering system 30, which may then be indicated by the target torque data 340. Alternatively, the active damper control module 334 may be configured to determine the target torque data 340 by applying one or more of these data items to a formula, which may likewise be stored in the ECU 126.

In block 260, the current torque (sometimes alternatively referred to as the second torque so as to distinguish from the first torque or EPS torque 344 applied to the steering system 30 as described below) on the steering system 30 may be determined. In particular, the ECU 126 may be configured to determine steering torque data 352 (labeled as Input Torque 352 in FIG. 7) indicating the current torque on the steering system 30 based on operational data generated by the sensors 130, such as the torque sensor.

In block 262, the target torque and the current torque on the steering system 30 may be compared to determine an error therebetween. Specifically, the active damper control module 334 may be configured to perform an addition 341 of the target torque data 340 and the steering torque data 352 to calculate an error between the current torque on the steering system 30 and the target torque for the steering system 30. The active damper control module 334 may be configured to apply the resulting error to a control algorithm 342.

In block 264, an EPS torque 344 (see FIG. 7—sometimes alternatively referred to as a first torque) to apply to the steering system 30 may be determined based on the comparison. Specifically, the control algorithm 342, which may include a proportional-integral-derivative (PID) algorithm, may be configured to determine an EPS torque 344 that reduces or eliminates the error. For instance, the control algorithm 342 may determine, as the EPS torque 344, a resistive torque that has a magnitude equal to the error and is in a direction that is opposite the rotation of the handle 38.

In block 266, the EAD 124 may be operated to apply the EPS torque 344 to the steering system 30. For instance, the ECU 126 may be configured to generate a command signal for the EAD 124 that, upon receipt by the EAD 124, causes the EAD 124 to apply the EPS torque 344 onto the steering system 30, such as via the steering column 32. More particularly, the steering control data may define a lookup table associating each of various electrical current levels with a torque level applied to the steering system 30, or more particularly the steering column 32, by the EAD 124 responsive to application of the electrical current level to the motor 125. The ECU 126 may thus be configured to cause an electrical current level associated with the EPS torque 344 in the steering control data 212 to be supplied to the motor 125.

As previously described, the EPS torque 344 may be a resistive torque that is applied in a direction opposite the rotation of the handle 38. The applied torque may thus make the handle 38 more difficult to turn and may thereby provide feedback to the user/operator. The amount of feedback may correspond to current operational parameters of the snowmobile 10, such as one or more of the angle the steering system 30, which may be represented by the angle of the handle 38, the speed of the steering system 30, which may be represented by the rotation speed of the handle 38, the engine 16 RPM value, the engine torque request value, and the speed of the snowmobile 10.

In alternative embodiments, and as noted above, the EPS torque 344 may be a centering torque that is applied in a direction opposite the rotation of the handle 38 to return the steering system 30 to the center position (i.e., the position wherein the user operated steering element 38, such as the handle 38, is centered such that the snowmobile 10 is propelled straight corresponding to an axis defined along the length of the snowmobile 10).

In some examples, rather than determining and comparing the target torque data 340 with the steering torque data 352, the active damper control module 334 may be configured to determine the EPS torque 344 based on operational data consisting only of the angle and speed of rotation of the steering system 30 (e.g., the steering angle/speed data 328). In other words, determining steering torque target data 340 and the comparison 341 may be omitted. In this case, the steering control data may include a lookup table that associates each of various angle and speed combinations with a value of the EPS torque 344, or more particularly with an electrical current level to apply to the motor 125 of the EAD 124 to cause the EAD 124 apply that value for the EPS torque 344. Accordingly, the active damper control module 334 may be configured to determine the EPS torque 344, or more particularly the electrical current level for causing the EAD 126 to provide the EPS torque 344, by querying the steering control data based only on the angle and speed of rotation of the steering system 30, thus reducing processing time for implementation the active damper.

As illustrated in both FIGS. 6 and 7, the ECU 126 may be configured to implement a feedback loop that adjusts the EPS torque 344 applied to the steering system 30 by the EAD 124 to provide a user/operator with appropriate steering feedback during various parts of a turn. Specifically, the ECU 126 may be configured to adjust the applied EPS torque 344 based at least on updates to the steering angle/speed data 328 over time. For instance, referring to FIG. 6, the method 250 may loop back to monitoring for user torque on the steering system 30, determining and selecting a terrain condition mode, determining an angle and speed of steering system 30 caused by the user torque, and so on. Referring to FIG. 7, the processing architecture 300 may include a loop that, in each iteration, determines updated steering angle/speed data 328, and/or updated target torque data 340 and steering torque data 352, and determines an updated EPS torque 344 based thereon.

Snowmobiles 10 including enhanced steering control and the associated method of use are described herein. In one example, a snowmobile 10 may include the driving control system 102 coupled to a steering system 30 of the snowmobile 10 and configured to apply a torque to the steering system 30 based on electrical signals received from an ECU 126 via terrain condition and operational data generated by the plurality of sensors 130. During operation of the snowmobile 10, the driving control system 102 may be configured to implement enhanced steering functions, such as an active damper, regulated based on various operational parameters monitored by the ECU 126 and based on the selected terrain condition mode 700 as determined by the ECU 126.

The enhanced steering functions may install greater confidence in the user/operator, provide better steering control, and avoid potentially dangerous maneuvers. In particular, the present disclosure provides enhanced steering control of snowmobiles that functions to accelerate the skill learning curve for beginners operating the snowmobile, particularly in harsh terrain conditions such as icy terrain conditions or powdery snow terrain conditions. The present disclosure also reduces physical efforts needed to perform various maneuvers on the snowmobile as a function of the terrain conditions and operational conditions, as the steering assist provided herein would encourage steering in the proper direction to reach and maintain a balance target. Still further, the present disclosure assists a user in addressing an imbalance during a turn maneuver by allowing the user to initiate a body transfer to initiate sled roll while better being able to hold onto the handlebars as compared with normally lighter steering.

The present disclosure also provides damping or increases steering resistance when rider weight is transferred to the rear when driving in steep inclines (i.e., an uphill condition) or under harsh acceleration, which unloads the ground engaging members 14 and makes the steering effort by a user lighter and the steering effect on the ground engaging members 14 minimal. The present disclosure also provides steering assist or decreases steering resistance when rider weight is transferred to the front when driving in steep declines (i.e., a downhill condition) or under harsh braking, which loads the ground engaging members 14 and makes the steering effort by a user harder and the steering effect to address plowing effect of the ground engaging members or the nose of the snowmobile 10 in deep snow conditions which make the snowmobile 10 harder to steer. The present disclosure also provides steering assist when rider weight is centered onto the seat 40 when driving in flat conditions (i.e., a neutral conditions, which is neither a downhill condition nor an uphill condition). In each embodiment, the controller 126 is configured to determine whether the snowmobile 10 is in the downhill, neutral or uphill conditions and the driving control system 102 is configured to modify the relative degree of the applied torque to the steering system 30 based on the determined uphill condition or based on the determined downhill condition or based on the determined neutral condition.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

The invention claimed is:

1. A driving control system for enhancing steering control of a snowmobile, the snowmobile having a vehicle body including an engine disposed in the vehicle body, a drive track device coupled to the engine with the drive track device including a track belt positioned on the terrain, and at least one ground engaging member disposed at a lower side of the vehicle body and positioned on the terrain, the driving control system comprising:

a steering system having a user operated steering element for adjusting an angle of the at least one ground engaging member relative to a longitudinal axis of the snowmobile;

a throttle mounted to the user operated steering element and adapted to be coupled to the engine to adjust an operation of the engine to actuate the drive track device to rotate the track belt for propelling the snowmobile along the terrain;

an electrically actuated device coupled to the steering system for applying a torque to the steering system;

a plurality of sensors to generate terrain condition data of the terrain and to generate operational data of the snowmobile, wherein said plurality of sensors comprises a torque sensor to generate a portion of the operational data of the snowmobile and at least one additional sensor; and at least one controller coupled to the electrically actuated device and the sensors, the at least one controller:

selecting a terrain condition mode using the generated terrain condition data and the generated operational data, wherein the terrain condition mode is selected from an ice on-trail mode, a snow on-trail mode, and a powder off-trail mode;

determining a torque to apply to the steering system responsive to an angle and speed of rotation of the user operated steering element by using the selected terrain condition mode and the generated operational data; and operating the electrically actuated device to apply the torque to the steering system for providing enhanced steering control of the snowmobile responsive to the angle and speed of rotation of the user operated steering element, with the torque being applied only by the electrically actuated device.

2. The driving control system according to claim 1, wherein the at least one controller operates the electrically actuated device to apply the torque to the steering system during the rotation of the user operated steering element in a direction that is opposite the rotation of the user operated steering element.

3. The driving control system according to claim 1, wherein the at least one additional sensor is selected from the group consisting of a tachometer, a torque request sensor, a speedometer, a track belt sensor, a force sensor, a side load torque sensor, a steering angle sensor, a position sensor, a global positioning satellite module and an inertial navigation system module.

4. The driving control system according to claim 1, wherein the at least one controller determines the torque to apply to the steering system responsive to an angle and speed of rotation of the user operated steering element by:

using the selected terrain condition mode and the generated operational data to determine a current torque of the steering system responsive to the angle and speed of rotation of the user operated steering element;

using the selected terrain condition mode and the generated operational data to calculate a target torque for the steering system responsive to the angle and speed of rotation of the user operated steering element; and operating the electrically actuated device to adjust the torque applied to the steering system responsive to the angle and speed of rotation of the user operated steering element from the determined current torque to the calculated target torque.

5. The driving control system according to claim 4, wherein the at least one controller calculates the target torque from an engine RPM value, an engine torque request value, and a determined current speed of the snowmobile on the terrain.

6. The driving control system according to claim 4, wherein the target torque is a centering torque.

7. The driving control system according to claim 1, wherein the at least one controller implements a feedback loop that adjusts the torque applied to the steering system based on updates to the selected terrain condition mode and angle and speed of rotation of the user operated steering element over time.

8. The driving control system according to claim 1, wherein the user operated steering element comprises a handle.

9. The driving control system according to claim 1, wherein the at least one controller determines an uphill condition, a neutral condition, or a downhill condition of the snowmobile on the terrain and modifies a relative degree of the torque applied to the steering system based on the determined uphill condition or based on the determined downhill condition.

10. The driving control system according to claim 3, wherein the at least one additional sensor comprises the torque request sensor and the inertial navigation system module, and wherein the controller selects the terrain condition mode by:

(a) using the torque request sensor to determine a relative throttle rate of the throttle;

(b) using the inertial navigation system module to determine a relative degree of vehicle roll of the snowmobile;

(c) using at least the torque sensor to determine a relative degree of steering damping gain for the snowmobile;

(d) using the controller to select a preliminary terrain condition mode for each of the determined relative throttle rate and the determined relative degree of vehicle roll, and the determined relative degree of steering damping gain of parts (a)-(c), wherein the selected preliminary terrain condition mode is selected from a snow on-trail preliminary terrain condition mode, a powder off-trail preliminary terrain condition mode, and an ice on-trail preliminary condition mode;

(e) using the controller to compare the selected preliminary terrain condition modes for each of the determined relative throttle rate, the determined relative degree of vehicle roll, and the determined relative degree of steering damping gain for the snowmobile in part (d);

(f) using the controller to select the terrain condition mode from the comparison of the selected preliminary terrain condition modes in part (e).

11. The driving control system according to claim 10, wherein the at least one controller:

selects the snow on-trail preliminary terrain condition mode for part (a) when the determined relative throttle rate of the throttle exceeds a predetermined high threshold throttle rate;

selects the powder off-trail preliminary terrain condition mode for part (a) when the determined relative throttle rate of the throttle is below a predetermined low threshold throttle rate; or selects the ice on-trail preliminary terrain condition mode for part (a) when the determined relative throttle rate of the throttle is between the predetermined high threshold throttle rate and the predetermined low threshold throttle rate.

12. The driving control system according to claim 10, wherein the at least one controller:
    selects the powder off-trail preliminary terrain condition mode for part (b) when the determined relative degree of vehicle roll exceeds a predetermined y-angular position vehicle roll rate; or
    selects the snow on-trail preliminary terrain condition mode for part (b) when the determined relative degree of vehicle roll is at or below the predetermined y-angular position vehicle roll rate.

13. The driving control system according to claim 10, wherein the at least one controller:
    selects the ice on-trail preliminary terrain condition mode for part (c) when the determined steering damping gain exceeds a predetermined high threshold steering damping gain;
    selects the powder off-trail preliminary terrain condition mode for part (c) when the determined steering damping gain is below a predetermined low threshold steering damping gain; or
    selects the snow on-trail preliminary terrain condition mode for part (c) when the determined steering damping gain is between the predetermined high threshold steering damping gain and the predetermined low threshold steering damping gain.

14. The driving control system according to claim 3, wherein the at least one additional sensor comprises the torque request sensor and the inertial navigation system module, and wherein the controller selects the terrain condition mode by:
    (a) using the torque request sensor to determine a relative throttle rate of the throttle;
    (b) using the inertial navigation system module to determine a relative degree of vehicle roll of the snowmobile;
    (c) using at least the torque sensor to determine a relative degree of steering damping gain for the snowmobile;
    (d) using the speedometer or the global positioning satellite module, or both the speedometer and global positioning satellite module, to determine a relative degree of track slip between the track belt and the terrain;
    (e) using the position sensor to determine a relative degree of load applied to a shock coupled to the at least one ground engaging member;
    (f) using the force sensor to determine a force applied to a seat coupled to the vehicle body from a user;
    (g) using the global positioning satellite module to determine a relative positioning of the snowmobile on the terrain;
    (h) using the side load torque sensor to determine a relative degree of steering side load;
    (i) using the controller to select a preliminary terrain condition mode for each of the determined relative throttle rate and the determined relative degree of vehicle roll, the determined relative degree of steering damping gain for the snowmobile, the determined relative degree of track slip between the track belt and the terrain, the determined relative degree of load applied to the shock coupled to the at least one ground engaging member, the determined force applied to the seat coupled to the vehicle body from a user, the determined relative positioning of the snowmobile on the terrain, and the determined relative degree of steering side load of parts (a)-(h), wherein the selected preliminary terrain condition mode is selected from a snow on-trail preliminary terrain condition mode, a powder off-trail preliminary terrain condition mode, and an ice on-trail preliminary condition mode; and
    (j) selecting the terrain condition mode based on a comparison of the selected preliminary terrain condition modes of part (i).

15. The driving control system according to claim 14, wherein the at least one controller:
    selects the snow on-trail preliminary terrain condition mode for part (a) when the determined relative throttle rate of the throttle exceeds a predetermined high threshold throttle rate;
    selects the powder off-trail preliminary terrain condition mode for part (a) when the determined relative throttle rate of the throttle is below a predetermined low threshold throttle rate; or
    selects the ice on-trail preliminary terrain condition mode for part (a) when the determined relative throttle rate of the throttle is between the predetermined high threshold throttle rate and the predetermined low threshold throttle rate.

16. The driving control system according to claim 14, wherein the at least one controller:
    selects the powder off-trail preliminary terrain condition mode for part (b) when the determined relative degree of vehicle roll exceeds a predetermined y-angular position vehicle roll rate; or
    selects the snow on-trail preliminary terrain condition mode for part (b) when the determined relative degree of vehicle roll is at or below a predetermined y-angular position vehicle roll rate.

17. The driving control system according to claim 14, wherein the at least one controller:
    selects the ice on-trail preliminary terrain condition mode for part (c) when the determined steering damping gain exceeds a predetermined high threshold steering damping gain;
    selects a powder off-trail preliminary terrain condition mode for part (c) when the determined steering damping gain is below a predetermined low threshold steering damping gain; or
    selects the snow on-trail preliminary terrain condition mode for part (c) when the determined steering damping gain is between the predetermined high threshold steering damping gain and the predetermined low threshold steering damping gain.

18. The driving control system according to claim 14, wherein the at least one controller:
    selects the ice on-trail preliminary terrain condition mode for part (d) when the determined relative amount of track slip exceeds a predetermined high threshold relative amount of track slip;
    selects the snow on-trail preliminary terrain condition mode for part (d) when the determined relative amount of track slip is below a predetermined low threshold relative amount of track slip; or
    selects the powder off-trail preliminary terrain condition mode for part (d) when the determined relative amount of track slip is between the predetermined high threshold relative amount of track slip and the predetermined low threshold relative amount of track slip.

19. The driving control system according to claim 14, wherein the at least one controller:
    equally selects the ice on-trail preliminary terrain condition mode and the snow on-trail preliminary terrain condition mode for part (e) when the determined relative degree of load applied to the shock exceeds a predetermined high threshold relative degree of load applied to the shock; or selects the powder off-trail preliminary terrain condition mode for part (e) when the determined relative degree of load applied to the shock is at or below the predetermined high threshold relative degree of load applied to the shock.

20. The driving control system according to claim 14, wherein the at least one controller:

equally selects the ice on-trail preliminary terrain condition mode and the snow on-trail preliminary terrain condition mode for part (f) when the determined relative degree of force applied to the seat exceeds a predetermined high threshold relative degree of force applied to the seat; or selects the powder off-trail preliminary terrain condition mode for part (f) when the determined relative degree of force applied to the seat is at or below the predetermined high threshold relative degree of force applied to the seat.

21. The driving control system according to claim 14, wherein the at least one controller:

equally selects the ice on-trail preliminary terrain condition mode and the snow on-trail preliminary terrain condition mode for part (g) when the determined relative position of the snowmobile is on one of the known trails of the plurality of known trails; or selects the powder off-trail preliminary terrain condition mode for part (g) when the determined relative position of the snowmobile is not on one of the known trails of the plurality of known trails.

22. The driving control system according to claim 14, wherein the at least one controller:

equally selects the ice on-trail preliminary terrain condition mode and the snow on-trail preliminary terrain condition mode for part (h) when the determined steering side load exceeds a predetermined high threshold steering side load; or selects the powder off-trail preliminary terrain condition mode for part (h) when the determined side steering load is at or below a predetermined low threshold steering side load.

23. A snowmobile for use in driving on a terrain, said snowmobile comprising:

a driving control system coupled to the steering system according to claim 1, the vehicle body, the engine disposed in the vehicle body, the drive track device coupled to the engine with the drive track device including the track belt adapted to be positioned on the terrain; and the at least one ground engaging member disposed at the lower side of the vehicle body and adapted to be positioned on the terrain.

24. A method for enhancing steering control of a snowmobile, the snowmobile having a vehicle body including an engine disposed in the vehicle body; a drive track device coupled to the engine with the drive track device including a track belt positioned on the terrain; at least one ground engaging member disposed at a lower side of the vehicle body and positioned on the terrain; a steering system having a user operated steering element for adjusting an angle of the at least one ground engaging member relative to a longitudinal axis of the snowmobile; a throttle mounted to the user operated steering element and coupled to the engine to adjust the operation of the engine to actuate the drive track device to rotate the track belt for propelling the snowmobile along the terrain; and a plurality of sensors to generate terrain condition data of the terrain and to generate operational data of the snowmobile, wherein said plurality of sensors comprises a torque sensor to generate a portion of the operational data of the snowmobile and at least one additional sensor; the method comprising the steps of:

determining a terrain condition mode based on the generated terrain condition data and the generated operational data, wherein the terrain condition mode is selected from an ice on-trail mode, a snow on-trail mode, and a powder off-trail mode;

receiving rotational movement of the user operated steering element;

determining a torque to apply to the steering system responsive to an angle and speed of the received rotational movement of the user operated steering element by using the selected terrain condition mode and the generated operational data; and operating the electrically actuated device to apply the torque to the steering system for providing enhanced steering control of the snowmobile responsive to the angle and speed of rotational movement of the user operated steering element, with the torque being applied only by the electrically actuated device.

\* \* \* \* \*